United States Patent
Zhovnirovsky et al.

(10) Patent No.: US 8,135,281 B2
(45) Date of Patent: Mar. 13, 2012

(54) FREE SPACE OPTICAL CONNECTOR

(75) Inventors: Igor Zhovnirovsky, Newton, MA (US); Subhash Roy, Lexington, MA (US); Keith Conroy, Perkasie, PA (US)

(73) Assignee: Applied Micro Circuits Corporation, San Diego, CA (US)

( * ) Notice: Subject to any disclaimer, the term of this patent is extended or adjusted under 35 U.S.C. 154(b) by 504 days.

(21) Appl. No.: 12/422,265

(22) Filed: Apr. 11, 2009

(65) Prior Publication Data
US 2010/0260503 A1    Oct. 14, 2010

(51) Int. Cl.
*H04B 10/00*    (2006.01)
(52) U.S. Cl. .......................... 398/128; 398/118; 398/96
(58) Field of Classification Search ............ 398/96, 398/103, 118, 119, 126–131, 135–139, 172; 385/92; 359/172; 250/216
See application file for complete search history.

(56) References Cited

U.S. PATENT DOCUMENTS

| | | | |
|---|---|---|---|
| 6,821,029 B1 * | 11/2004 | Grung et al. | 385/92 |
| 7,013,088 B1 * | 3/2006 | Jiang et al. | 398/139 |
| 7,446,298 B1 * | 11/2008 | Stone | 250/216 |
| 2002/0141020 A1 * | 10/2002 | Doucet et al. | 359/172 |
| 2004/0258415 A1 * | 12/2004 | Boone et al. | 398/125 |
| 2005/0031350 A1 * | 2/2005 | Haber | 398/128 |
| 2006/0093373 A1 * | 5/2006 | Hahin et al. | 398/136 |
| 2009/0028579 A1 * | 1/2009 | Deng | 398/200 |

* cited by examiner

*Primary Examiner* — Li Liu
(74) *Attorney, Agent, or Firm* — Law Office of Gerald Maliszewski; Gerald Maliszewski (57) ABSTRACT

A Free Space Optics (FSO) connector is provided with a method for interfacing to an electronic circuit card electrical connector via the FSO connector. The method transceives electrical signals via an electronic circuit card electrical connector. Using an FSO connector, the method converts between electrical signals and optical signals, and transceives optical signals via free space. In one aspect, the optical signals are initially received via free space along a first axis, and reflected along a second axis. Further, the optical signals may be initially transmitted along the second axis and reflected into free space along the first axis. In another aspect, the optical signals are transceived in a plurality of directions in free space. For example, optical signals may be transmitted and received in four mutually-orthogonal axes.

8 Claims, 9 Drawing Sheets

Fig. 10

FREE SPACE OPTICAL CONNECTOR

BACKGROUND OF THE INVENTION

1. Field of the Invention

This invention generally relates to the interfacing of electrical and optical communication signals and, more particularly, to a free space optical connector and associated connection method.

2. Description of the Related Art

Conventionally, communication signals are carried via conductive metal lines on a circuit board or metal wires in a connector cable. Copper and aluminum are metals often used for this purpose. With the increased use of high-speed long distance communications, optical signals were introduced, carried through an optical fiber medium. In some communication links, an interface must be used to convert between electrical and optical signals.

An electrical system such as a computer or communications network is comprised of a plurality of modules that are connected via cables. The cables are bulky and prone to failure. Optical cables are relatively stiff and difficult to fit into limited cabinet space or "bend" around corners.

A small form-factor pluggable (SFP) is a compact, hot-pluggable transceiver used in optical communications. It interfaces a network device mother board, such as a switch, router, or media converter, to a fiber optic or copper networking cable. It is a popular industry format supported by several network component vendors. SFP transceivers are designed to support SONET, Gigabit Ethernet, Fibre Channel, and other communications standards. The standard is expanding to SFP+, which will be able to support data rates up to 10.0 Gbit/s (e.g., 8 gigabit Fibre Channel and 10 GbE). SFP+ module versions for optics as well as copper are being introduced.

SFP transceivers are available with a variety of different transmitter and receiver types, allowing users to select the appropriate transceiver for each link, to provide the required optical reach over the available optical fiber type (e.g., multi-mode fiber or single-mode fiber). Optical SFP modules are commonly available in several different categories: 850 nm 550 m MMF (SX), 1310 nm 10 km SMF (LX), 1550 nm [40 km (XD), 80 km (ZX), 120 km (EX or EZX)], and DWDM. There are also CWDM and single-fiber "bi-directional" (1310/1490 nm Upstream/Downstream) SFPs. The SFP was designed after the GBIC interface, and allows for greater port density (number of transceivers per inch along the edge of a mother board) than the GBIC, which is why SFP is also known as mini-GBIC.

It is also possible to communicate optical signals via free space. The conventional television remote control uses infrared optical wavelengths to communicate commands. However, the optical signals are not focused, and can only be used to carry very simple communications a very short distance. The unfocused nature of the communications and the portable nature of the remote control unit prevent it from being used as a receiver, i.e. to receive signals from a television or set-top box.

It would be advantageous if optical signals could be communicated between circuits boards via free space, without the use of fiber optic cables.

SUMMARY OF THE INVENTION

Disclosed herein is a Free Space Optical (SPO) connector. In one aspect, a 4-way FSO small form-factor pluggable (SFP) is presented that allows high speed data connection in 4 orthogonal directions simultaneously over the air in direct line-of-sight (LOS). As an FSO SFP connector, each beam carries a 10 gigabits per second (Gbps) information stream adding up to a total connector bandwidth of 40 Gbps. The communication channels may be protocol agnostic, suitable for both data and telecommunications links. The FSO connector reduces dependency on expensive and costly-to-maintain fiber optic cables. To build the equivalent of an N×N mesh FSO interconnect would require $(N-1)^2$ fiber optic cables, in addition to regular SFP connectors.

Accordingly, a method is provided for interfacing to an electronic circuit card electrical connector via a Free Space Optics (FSO). The method transceives electrical signals via an electronic circuit card electrical connector. Using an FSO connector, the method converts between electrical signals and optical signals, and transceives optical signals via free space. In one aspect, the optical signals are initially received via free space along a first axis, and reflected along a second axis. Further, the optical signals may be initially transmitted along the second axis and reflected into free space along the first axis.

In another aspect, the optical signals are transceived in a plurality of directions in free space. For example, optical signals may be transmitted and received in four mutually-orthogonal axes.

Additional details of the above-described method, an FSO connector, and a circuit card with an FSO interface are provided below.

DETAILED DESCRIPTION

Figure 1:
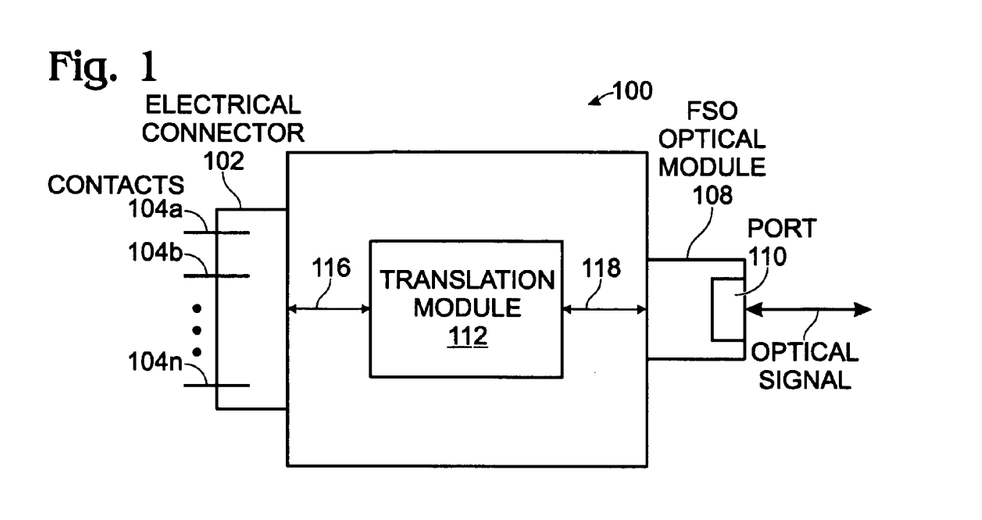
FIG. 1 is a schematic block diagram of a Free Space Optical (FSO) connector.

FIG. 1 is a schematic block diagram of a Free Space Optical (FSO) connector. The FSO connector 100 comprises an electrical connector 102 having a plurality of contacts 104 for engaging an electronics circuit card connector 106. Shown are contacts 104a through 104n, where n is a variable not limited to any particular value. A Small Form-Factor Pluggable (SFP) connector is one example of an electrical connector. However, there are hundreds of other connector types that could likewise enable the device. An FSO optical module 108 has at least one optic port 110 for transceiving optical signals via free space. As used herein, "transceiving" means to only transmit, only receive, or both transmit and receive signals.

A translation module 112 has a connector interface connected to the electrical connector on line 116 and an optical interface connected to FSO module 108 on line 118. The translation module 112 converts electrical signals received via the electrical connector 102 and transferred as optical signals via the optical interface 118. The translation module 112 converts optical signals received via the optical interface 118 and transferred as electrical signals via the electrical connector 102. Alternately, element 100 may be referred to as an FSO adaptor.

Figure 2:
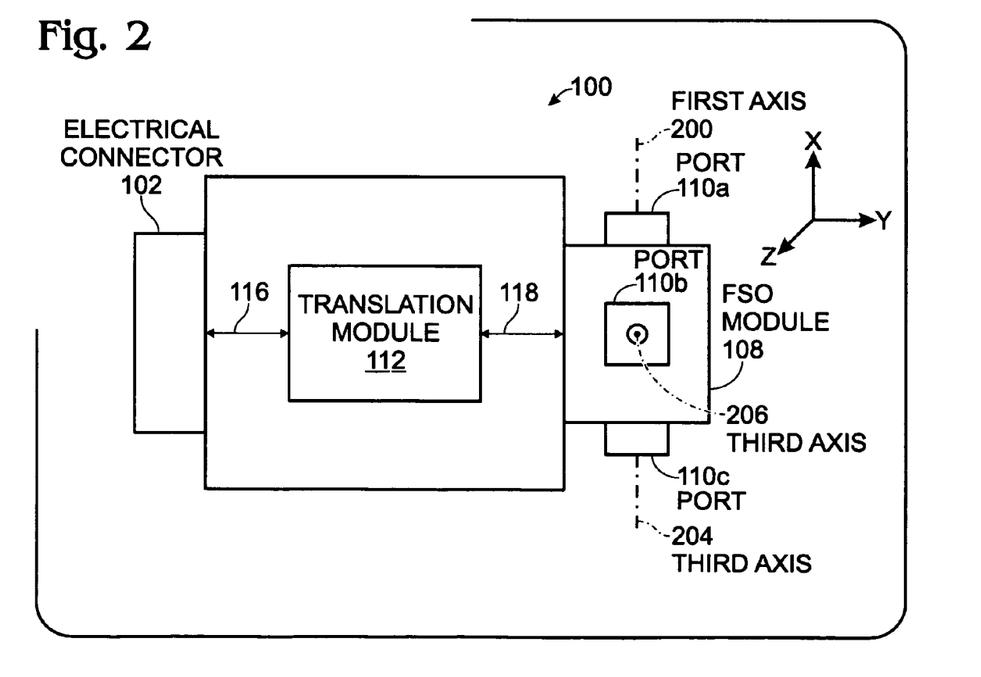
FIG. 2 is a schematic block diagram of a first variation of the FSO connector of FIG. 1.

FIG. 2 is a schematic block diagram of a first variation of the FSO connector of FIG. 1. In one aspect, the FSO optical module 108 includes a plurality of optic ports 110 for transceiving optical signals in a corresponding plurality of directions in free space. Shown are optical ports 110a through 110p, where p is a variable not limited to any particular value. For example, the FSO optical module 108 may transmit and/or receive optical signals along a first axis 200 in free space via port 110a, and transmit/or and receive optical signals along a second axis 202 in free space via port 110b. The second axis is defined with respect the first axis 200. Note: the second axis is coming out of the page (along the z axis) towards the reader. For example, the second axis may be fixed and orthogonal to the first axis. Alternately, the orientation of the first and second axes may be adjustable. As explicitly shown, the FSO optical module 108 may also transmit and receive optical signals along a third axis 204 via free space using port 110c, and transmit and receive optical signals along a fourth axis via free space using port (110n). Note, the fourth axis and port (110n) cannot be seen in this view, as they are on the opposite side of the FSO optical module from port 110b. If the axes are all orthogonal, the first and third axes may be the same, and the second and fourth axes may be the same. Alternately, the first and third axis may be in the same (x) vertical axis, but offset in the (y) horizontal or z axis. Likewise, the second and fourth axes may be in the same z axis, but offset in the x or y axis.

Figure 3:
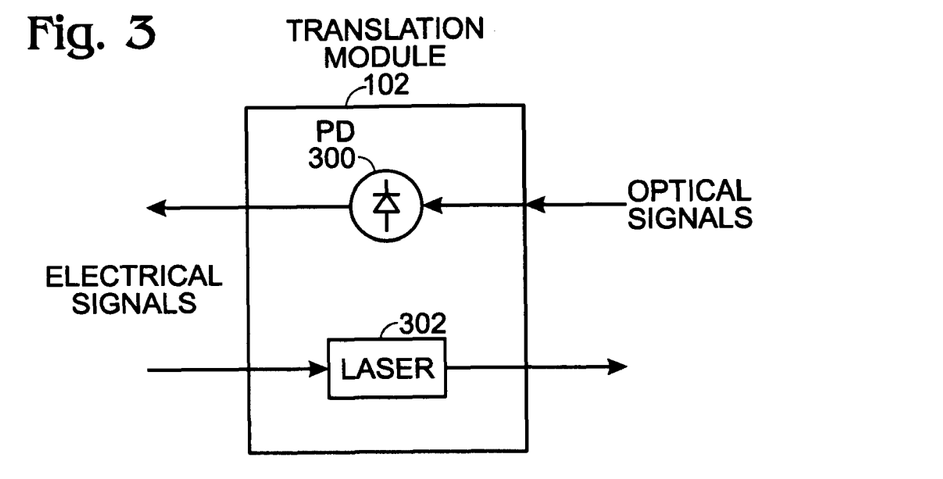
FIG. 3 is a schematic block diagram depicting the translation module of FIG. 1 in greater detail.

FIG. 3 is a schematic block diagram depicting the translation module of FIG. 1 in greater detail. In one aspect, the translation module 112 converts between electrical signals in a first signal format and optical signals in a second signal format. Alternately, the translation module simply reproduces the pulse frequencies, spacings, durations, or intensities of electrical signals into the equivalent optical signal pulse frequencies, spacings, durations, or intensities. In one aspect, the translation module may condition and filter signals without changing the format.

The translation module may be used to pre-condition the electrical signals driving the laser, and process the electrical signals recovered by the PD. For example, the electrical signals may be filtered or (re)aligned with a clock. In one aspect, a clock is generated from the received electrical signal, which is output to the line card via the electrical connector 102. Generally, a received signal requires more processing than a transmitted signal.

In another aspect, the translation module 112 includes a photodiode (PD) 300 to accept optical signals received by the FSO optical module. The PD 300 converts the optical signal to an electrical signal supplied to the electrical connector. The translation module 112 may also include a laser 302 to accept electrical signals received via the electrical connector. The laser 302 converts the electrical signal to an optical signal supplied to the FSO optical module. For example, the laser 302 can be a laser diode.

Figure 4A:
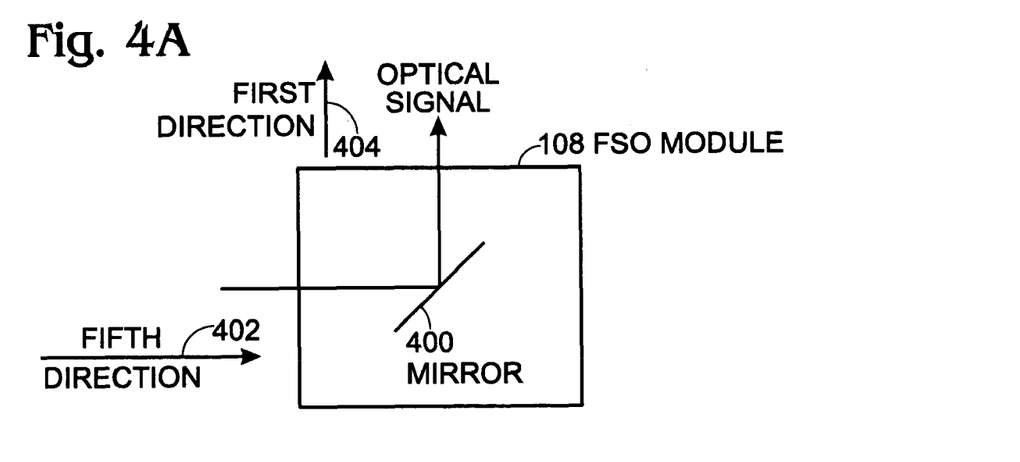
FIGS. 4A and 4B are schematic block diagram depicting a variation of the FSO optical module in greater detail.
Figure 4B:
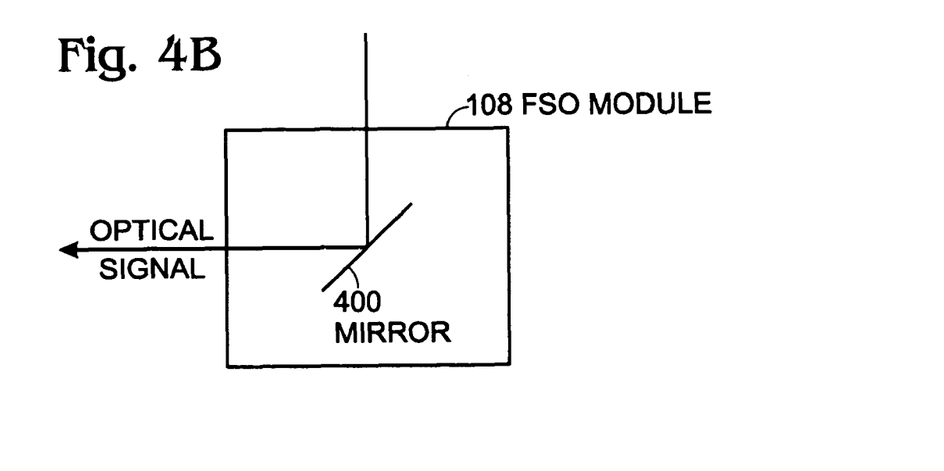

FIGS. 4A and 4B are schematic block diagram depicting a variation of the FSO optical module in greater detail. In FIG. 4A, the FSO optical module 108 includes a mirror 400 to accept an optical signal supplied by the translation module in a fifth direction 402. The mirror 400 reflects the optical signal for transmission via free space in a first direction 404. In FIG. 4B, a mirror 400 is used to accept optical signals received via free space from the first direction, and reflect them towards the translation module into (opposite to) the fifth direction. In another aspect not shown, transmit and receive optical signals are transceived on the same signal path, implying signal duplexing.

Figure 5:
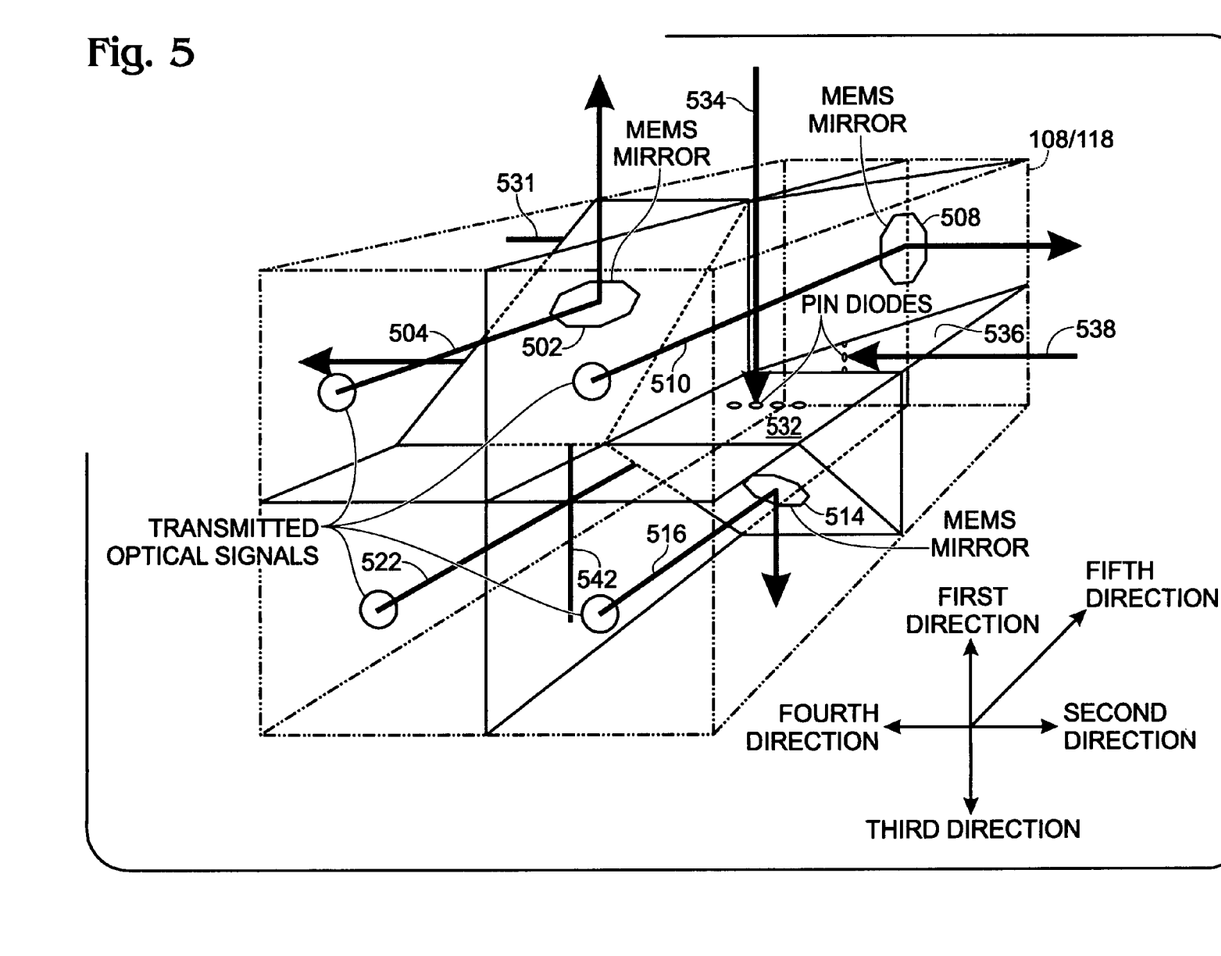
FIG. 5 is a perspective drawing of an FSO optical module transceiving in a plurality of directions through the use of mirrors.

FIG. 5 is a perspective drawing of an FSO optical module transceiving in a plurality of directions through the use of mirrors. As shown, the translation module supplies foul optical signals in a fifth direction 500. The FSO optical module 108 includes a first mirror 502 to accept a first optical signal 504, and reflect the first optical signal for transmission via free space in the first direction. A second mirror 508 accepts a second optical signal 510 and reflects the second optical signal for transmission via free space in the second direction, orthogonal to the first direction 506. A third mirror 514 accepts a third optical signal 516 and reflects the third optical signal for transmission via free space in the third direction, 180 degrees from the first direction 506 (and orthogonal to second direction). A fourth mirror (520, not shown) accepts a fourth optical signal 522 and reflects the fourth optical signal for transmission via free space in the fourth direction, 180 degrees from the second direction (and orthogonal to the first and third directions).

In this aspect, the translation module 112 includes a multifaceted FSO optical interface 118 including a first surface (530, not shown) orthogonal to the first direction to receive a fifth optical signal 531 via free space from the first direction. A second surface 532 is orthogonal to the second direction to receive a sixth optical signal 534 via free space from the second direction. A third surface 536 is orthogonal to the third direction 518 to receive a seventh optical signal 538 via free space from the third direction. A fourth surface (540, not shown) is orthogonal to the fourth direction to receive an eighth optical signal 542 via free space from the fourth direction.

Figure 6:
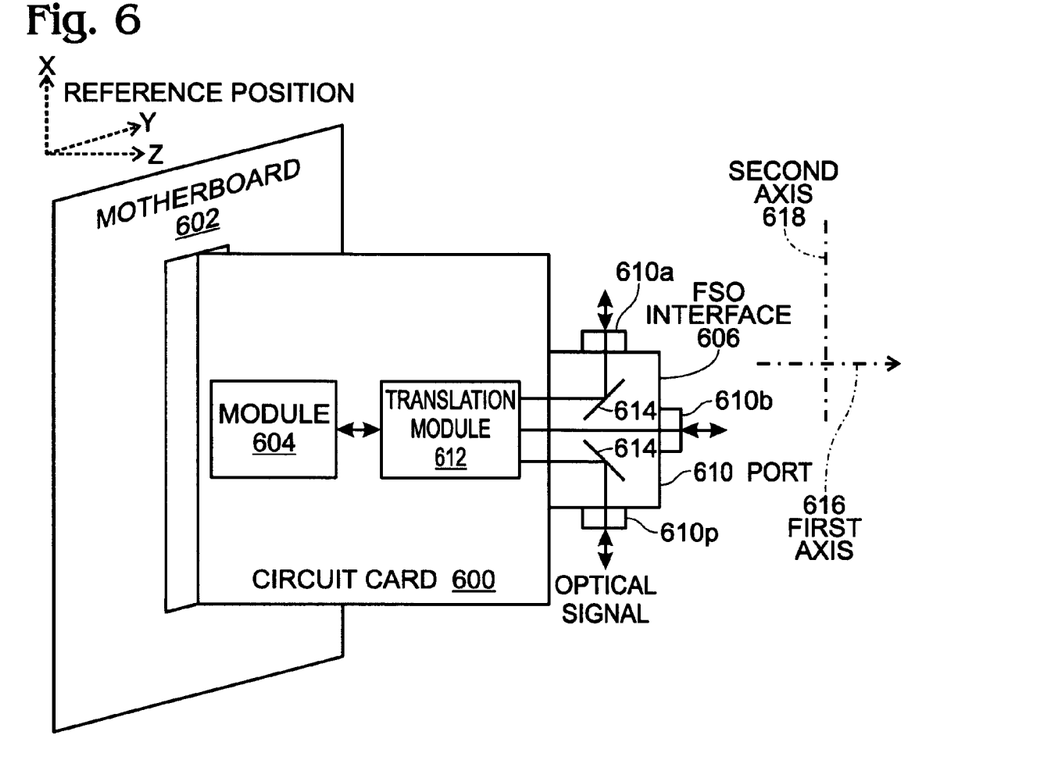
FIG. 6 is a schematic block diagram of a circuit card with a FSO interface.

FIG. 6 is a schematic block diagram of a circuit card with a FSO interface. In this aspect, there is no separate adaptor type connector that converts between a line card's electrical signals and optical signals. In this aspect, the line card is fabricated with a ("built-in") FSO interface. The built-in FSO interface shares many of the characteristics of the FSO connector shown in FIGS. 1 through 5, so some explicitly details are skipped in the interest of brevity.

Typically, the circuit card 600 is held in a fixed orientation with respect to a (x, y, z) reference. For example, the circuit card is plugged into a motherboard 602 (as shown), backplane, or cabinet. The orientation of the motherboard 602, backplane, or cabinet defines the reference. The circuit card 600 includes at least one module 604, which is circuitry for processing a signal. The circuit card 600 may transmit a signal, originated on the card, or received from another device (not shown). For example, the motherboard 602 may be a personal computer (PC) motherboard and card 600 may be a disk drive controller.

An FSO optical interface 606 is connected to the module 604 on the circuit card 600 and has at least one optic port 610 for transceiving optical signals via free space along a fixed axis (e.g., axis 616), with respect to the reference. In one aspect, the FSO optical module 606 includes a plurality of optic ports for transceiving optical signals in a corresponding plurality of fixed directions in free space. Shown are ports 610a through 610p, where p is an unlimited variable. In another aspect, the FSO optical module includes a mirror 614 to reflect optical signals between a first axis 616 and a second axis 618.

Optionally, the card 600 may include a translation module 612 interposed the circuit card modules 604 and the FSO optical module 606. The translation module 612 is a built-in module on the card, which is assembled with other modules during the card fabrication. The translation module converts between electrical signals transceived via the circuit card module 604 and optical signals transceived via the FSO optical optic port 608. The translation module 612 performs many of the same functions performed by the translation module of FIG. 1. Alternately, it is possible for the card (i.e. module 604) to process optical signals, in which case a translation module is not necessary.

Functional Description

In one aspect, the 4-way FSO connector of FIG. 5 may be a SFP connector intended for use in the multi-server enclosure environments, providing high speed inter-blade as well as inter-enclosure communication within a cabinet space. Each link may carries 4 bidirectional 10 gigabit per second (Gbps) data streams providing 40 Gbps aggregate bandwidth each direction, or 80 Gbps per port.

Figure 7A:
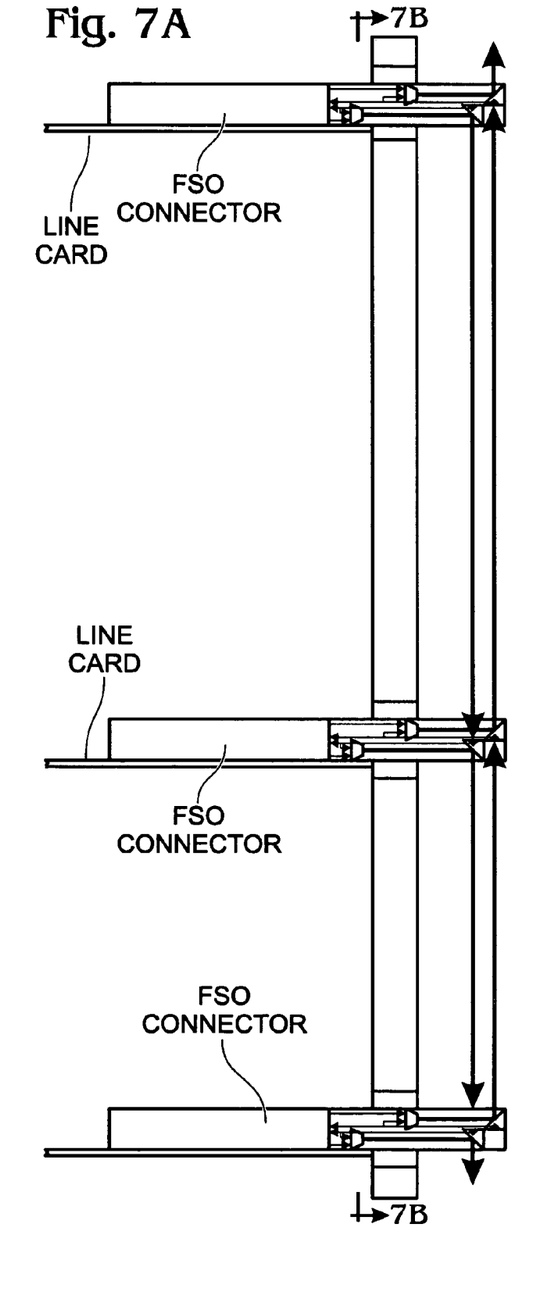
FIGS. 7A through 7C are diagrams depicting a network of FSO SFP connectors.
Figure 7B:
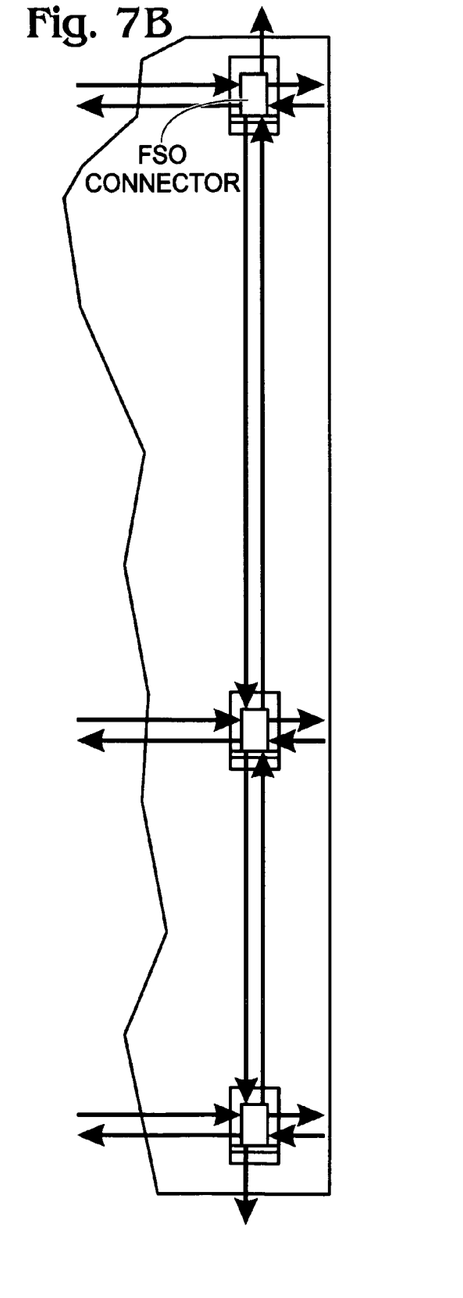
Figure 7C:
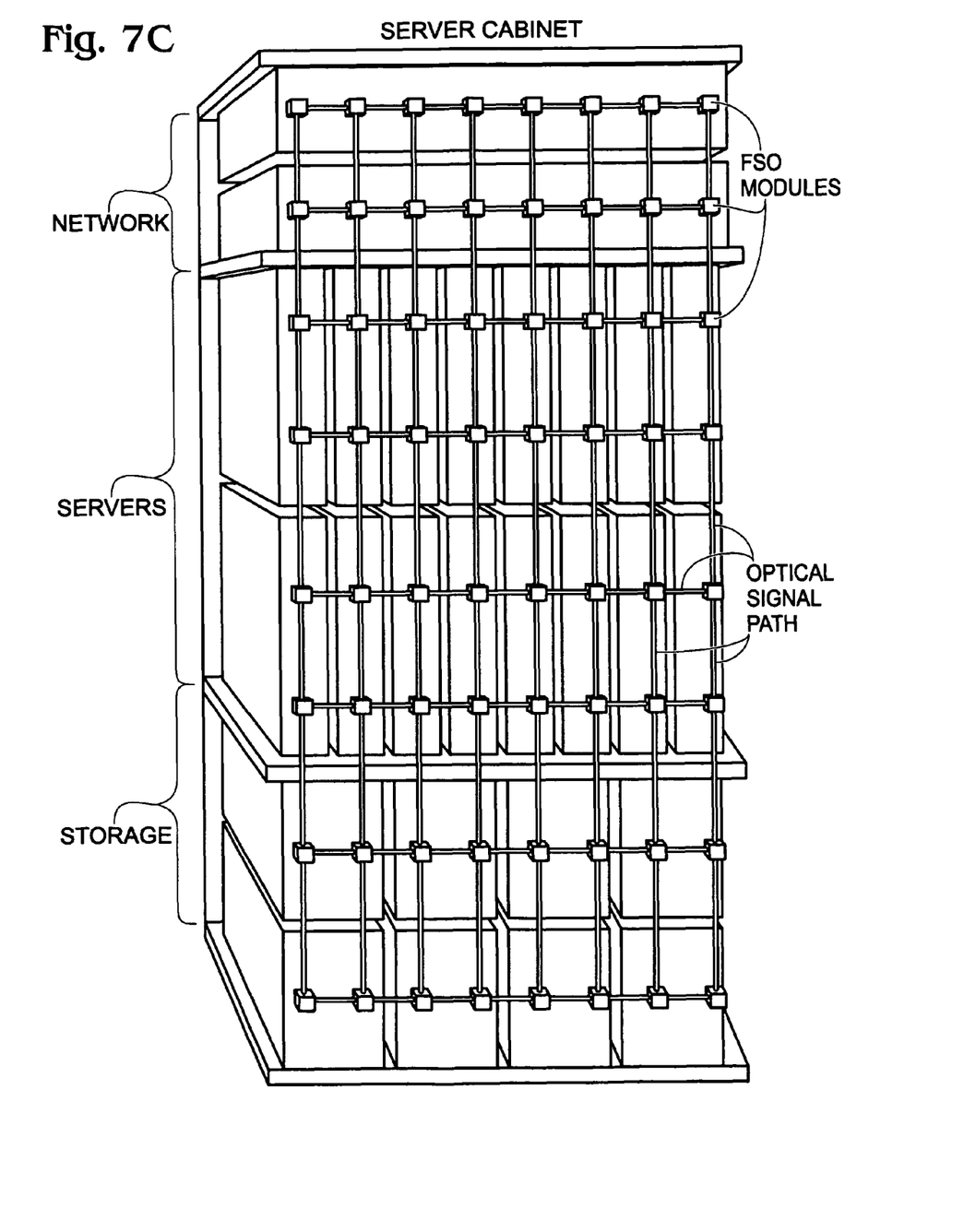

FIGS. 7A through 7C are diagrams depicting a network of FSO SFP connectors. In order to assemble a mesh network, each line card in the cabinet is optically interfaced using an FSO connector.

Figure 8:
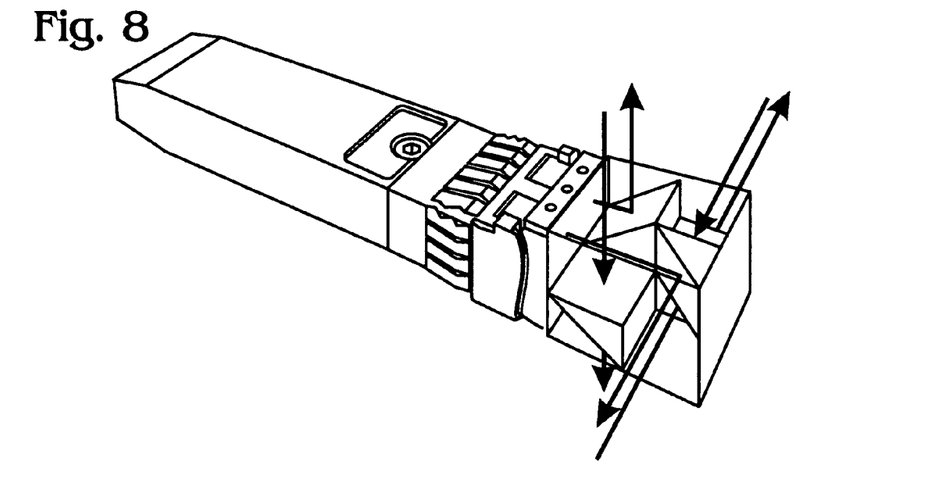
FIG. 8 is a perspective drawing depicting an exemplary FSO SFP connector in greater detail.

FIG. 8 is a perspective drawing depicting an exemplary FSO SFP connector in greater detail. When inserted a chassis, the FSO SFP protrudes beyond the backplane, inserting itself into FSO communication paths, in both vertical and horizontal directions. For example, each FSO SFP connector may comprise 4 transmitting laser assemblies, 4 receiving photodiode assemblies, 4 variable focus lenses, and 4 MEMS mirrors. In one aspect, the mirrors and/or lens may be used to adjust the optical signal path. Adjustments may be based upon feedback received in an optical or electrical signal, or based upon an open-loop search calibrations procedure.

Each laser assembly is used for transmitting the 10 Gbps data stream. Each photodiode (PD) assembly is used for receiving the 10 Gbps data stream. Each variable focus lens is used for assisting in maintaining the light channel's line-of-sight (LOS) and occasionally for the light channel re-alignment in case of communication loss or BER degradation. Each MEMS mirror is used for maintaining and realigning the light channel. The lasers and variable focus lenses may be positioned inside an opaque SFP body. The MEMS mirrors and PDs may be positioned outside the opaque SFP body—in the translucent head constructed with the infrared (IR) transparent plastic, for example, to reduce the ambient noise.

Figure 9:
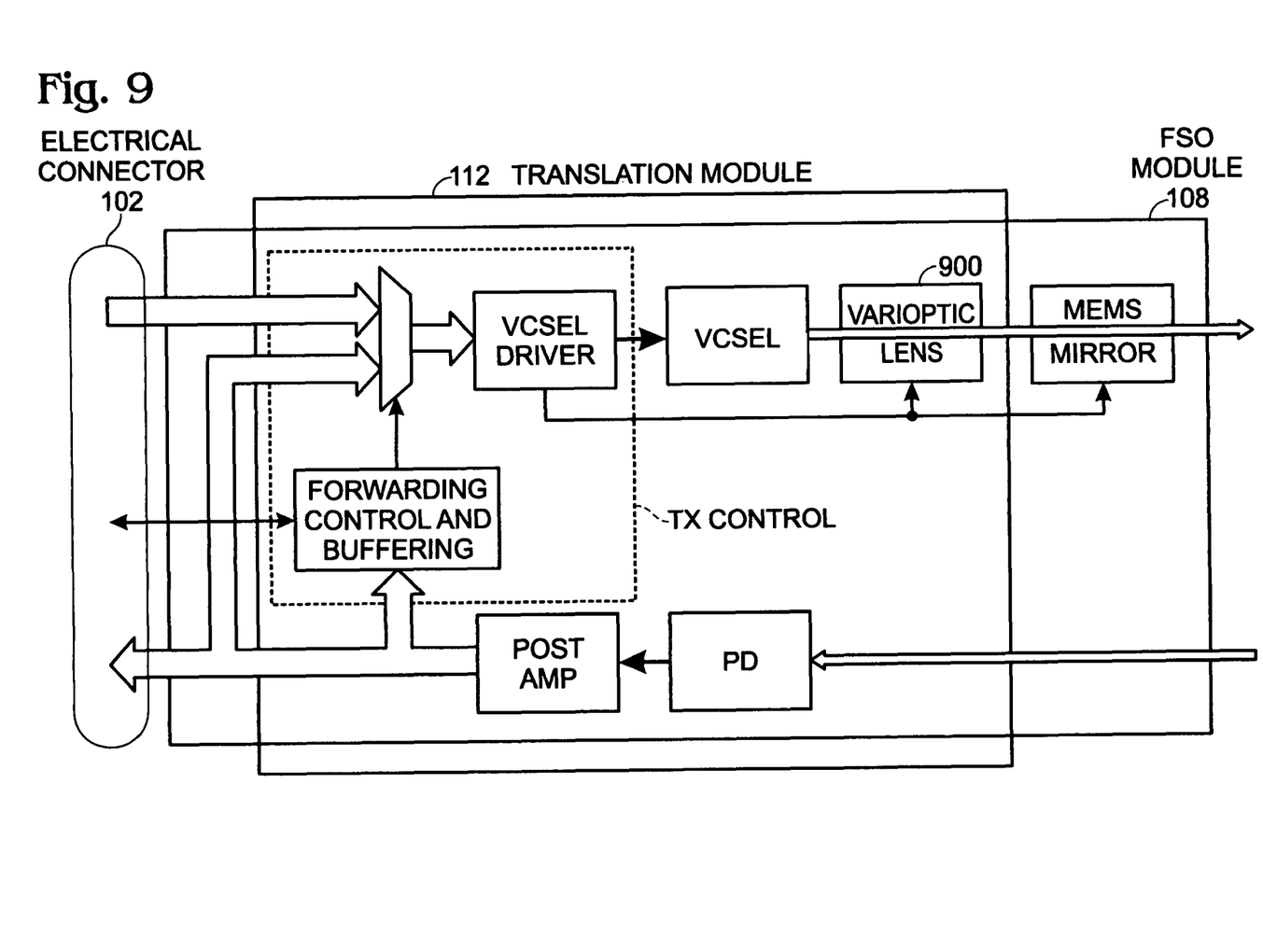
FIG. 9 is a schematic block diagram depicting translation modules details of an exemplary FSO connector.

FIG. 9 is a schematic block diagram depicting translation modules details of an exemplary FSO connector. In this aspect, the translation module 112 includes a varioptic lens 900. Alternately but not shown, the lens may be formed in the FSO module.

Figure 10:
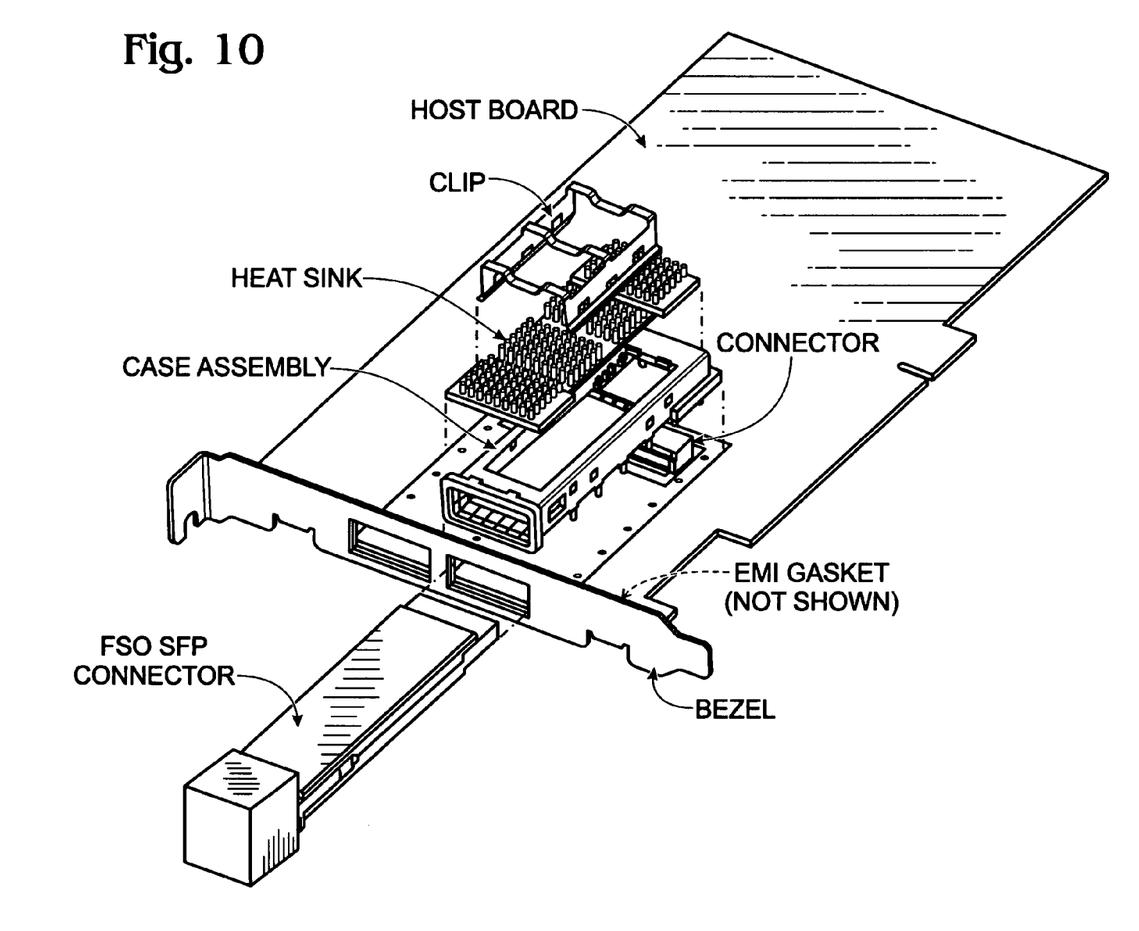
FIG. 10 is a perspective drawing depicting mechanical aspects of an exemplary FSO SFP connector.

FIG. 10 is a perspective drawing depicting mechanical aspects of an exemplary FSO SFP connector.

Figure 11:
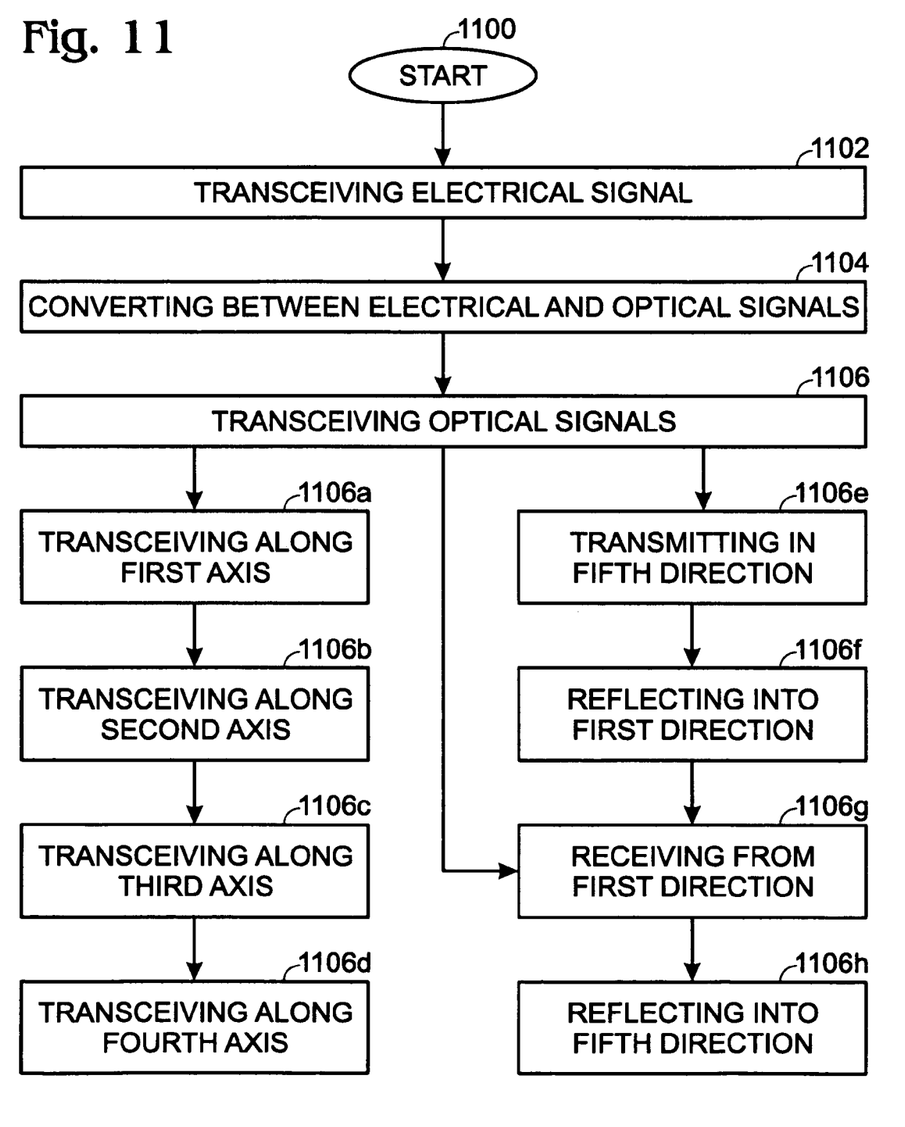
FIG. 11 is a flowchart illustrating a method for interfacing to an electronic circuit card electrical connector via Free Space Optics (FSO).

FIG. 11 is a flowchart illustrating a method for interfacing to an electronic circuit card electrical connector via Free Space Optics (FSO). Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1100.

Step 1102 transceives electrical signals via an electronic circuit card electrical connector. Using an FSO connector, Step 1104 converts between electrical signals and optical signals. In one aspect, converting between electrical signals and optical signals includes converting between electrical signals in a first signal format and optical signals in a second signal format. Step 1106 transceives optical signals via free space. In another aspect, transceiving optical signals via free space includes transceiving optical signals in a plurality of directions in free space.

For example, transceiving optical signals in a plurality of directions in free space (Step 1106) may include the following substeps. Step 1106a transmits and receives optical signals along a first axis in free space. Step 1106b transmits and receives optical signals along a second axis in free space. Step 1106c transmits and receives optical signals along a third axis in free space. Step 1106d transmits and receives optical signals along a fourth axis in free space.

In one variation, transceiving optical signals via free space may include the following substeps. Step 1106e initially supplies an optical signal for transmission in a fifth direction, and Step 1106f reflects the optical signal via free space in a first direction. Alternately, or in addition to Steps 1106e and 1106f, Step 1106g may initially receive an optical signal via free space in the first direction, and Step 1106h reflects the optical signal into the fifth direction.

Combining the subject matter of Step 1106a through 1106f, Step 1106a may initially supply the first optical signal for transmission in a fifth direction and reflect the first optical signal via free space in a first direction. Step 1106b then initially supplies the second optical signal for transmission in the fifth direction and reflects the second optical signal via free space in a second direction, orthogonal to the first direction. Likewise, Step 1106c initially supplies the third optical signal for transmission in the fifth direction and reflects the third optical signal via free space in a third direction, 180 degrees from the first direction. Step 1106d initially supplies the fourth optical signal for transmission in the fifth direction and reflects the fourth optical signal via free space in a fourth direction, 180 degrees from the second direction.

Although not specifically shown, the subject matter of Steps 1106g and 1106h can be combined with Steps 1106a through 1106d, so that the received signals are reflected, as an alternative to reflecting the transmitted signals, or in addition to reflecting the transmitted signals.

An FSO connector, a circuit card with an FSO interface, and an FSO connection methodology have been provided. A SFP line card has been used to illustrate the invention. However, the invention is not limited to any particular type of circuitry of signal format. Other variations and embodiments of the invention will occur to those skilled in the art.

We claim:
1. A Free Space Optical (FSO) connector comprising:
an electrical connector having a plurality of contacts for engaging an electronics circuit card connector;
an FSO optical module having a plurality of optic ports for transceiving optical signals via free space in a corresponding plurality of directions, the FSO optical module further including:

a first mirror to accept a first optical signal, and reflect the first optical signal for transmission via free space in a first direction;

a second mirror to accept a second optical signal, and reflect the second optical signal for transmission via free space in a second direction, orthogonal to the first direction;

a third mirror to accept a third optical signal, and reflect the third optical signal for transmission via free space in a third direction, 180 degrees from the first direction;

a fourth mirror to accept a fourth optical signal, and reflect the fourth optical signal for transmission via free space in a fourth direction, 180 degrees from the second direction;

a translation module having a connector interface connected to the electrical connector and an optical interface connected to FSO module, the translation module converting electrical signals received via the electrical connector and transferred as optical signals via the optical interface in a fifth direction, and converting optical signals received via the optical interface and transferred as electrical signals via the electrical connector; and, wherein the FSO optical module transmits and receives optical signals along a first axis in free space, transmits and receives optical signals along a second axis in free space, transmits and receives optical signals along a third axis via free space, and transmits and receives optical signals along a fourth axis via free space.

2. The connector of claim 1 wherein the translation module converts between electrical signals in a first signal format and optical signals in a second signal format.

3. The connector of claim 1 wherein the translation module includes a photodiode (PD) to accept optical signals received by the FSO optical module, the PD converting the optical signal to an electrical signal supplied to the electrical connector.

4. The connector of claim 1 wherein the translation module includes a laser to accept electrical signals received via the electrical connector, the laser converting the electrical signal to an optical signal supplied to the FSO optical module.

5. The connector of claim 1 wherein the translation module includes a multifaceted FSO optical interface including:

a first surface orthogonal to the first: direction to receive a fifth optical signal via free space from the first: direction;

a second surface orthogonal to the second direction to receive a sixth optical signal via free space from the second direction;

a third surface orthogonal to the third direction to receive a seventh optical signal via free space from the third direction; and, a fourth surface orthogonal to the fourth direction to receive an eighth optical signal via free space from the fourth direction.

6. The connector of claim 1 wherein the electrical connector is a Small Form-Factor Pluggable (SFP) connector for engaging an SEP transceiver.

7. A method for interfacing to an electronic circuit card electrical connector via Free Space Optics (FSO), the method comprising:

transceiving electrical signals via an electronic circuit card electrical connector;

using an FSO connector, converting between electrical signals and optical signals;

transceiving optical signals in a plurality of directions via free space as follows:

transmitting and receiving optical signals along a first axis in free space by supplying the first optical signal for transmission in a fifth direction, and reflecting the first optical signal via free space in a first direction;

transmitting and receiving optical signals along a second axis inn free space by supplying the second optical signal for transmission in the fifth direction, and reflecting the second optical signal via free space in a second direction, orthogonal to the first direction;

transmitting and receiving optical signals along a third axis in free space by supplying the third optical signal for transmission in the fifth direction, and reflecting the third optical signal via free space in a third direction, 180 degrees from the first direction; and, transmitting and receiving optical signals along a fourth axis in free space by supplying the fourth optical signal for transmission in the fifth direction, and reflecting the fourth optical signal via free space in a fourth direction, 180 degrees from the second direction.

8. The method of claim 7 wherein converting between electrical signals and optical signals includes converting between electrical signals in a first signal format and optical signals in a second signal format.

* * * * *